United States Patent
Shin et al.

(10) Patent No.: US 11,187,901 B2
(45) Date of Patent: Nov. 30, 2021

(54) SEE-THROUGH TYPE DISPLAY DEVICE AND AUGMENTED REALITY APPARATUS INCLUDING THE SAME

(71) Applicant: SAMSUNG ELECTRONICS CO., LTD., Suwon-si (KR)

(72) Inventors: Bongsu Shin, Seoul (KR); Sunil Kim, Seoul (KR); Wontaek Seo, Yongin-si (KR); Geeyoung Sung, Daegu (KR); Changkun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 16/275,424

(22) Filed: Feb. 14, 2019

(65) Prior Publication Data

US 2020/0088998 A1 Mar. 19, 2020

(30) Foreign Application Priority Data

Sep. 17, 2018 (KR) .................. 10-2018-0111022

(51) Int. Cl.
*G02B 27/01* (2006.01)
(52) U.S. Cl.
CPC .... *G02B 27/0172* (2013.01); *G02B 2027/011* (2013.01); *G02B 2027/0174* (2013.01); *G02B 2027/0178* (2013.01)
(58) Field of Classification Search
CPC ........ G02B 27/0172; G02B 2027/0174; G02B 2027/0178; G02B 2027/011
See application file for complete search history.

(56) References Cited

U.S. PATENT DOCUMENTS

| | | | |
|---|---|---|---|
| 3,704,936 A * | 12/1972 | Gorkiewicz | H04N 5/74 359/293 |
| 3,940,204 A * | 2/1976 | Withrington | G02B 5/32 359/19 |
| 6,094,283 A | 7/2000 | Preston | |
| 8,116,006 B2 | 2/2012 | Shimizu et al. | |
| 2007/0177275 A1* | 8/2007 | McGuire, Jr. | G02B 27/0172 359/630 |
| 2014/0226193 A1 | 8/2014 | Sun | |
| 2015/0036221 A1 | 2/2015 | Stephenson | |
| 2017/0242264 A1* | 8/2017 | Sissom | G02B 6/0076 |
| 2018/0129052 A1 | 5/2018 | Morrison | |
| 2018/0172981 A1* | 6/2018 | Ishii | G02B 5/32 |
| 2018/0196265 A1 | 7/2018 | Bouchier et al. | |

FOREIGN PATENT DOCUMENTS

| | | | | |
|---|---|---|---|---|
| CN | 103148395 A | * | 6/2015 | ................ F21S 2/00 |
| JP | 5286638 B2 | | 9/2013 | |
| KR | 10-2018-0044238 A | | 5/2018 | |

* cited by examiner

*Primary Examiner* — George G King
(74) *Attorney, Agent, or Firm* — Sughrue Mion, PLLC

(57) ABSTRACT

A see-through type display device includes an image generation unit configured to emit image light, a light coupling unit configured to generate off-axis aberration in the image light, and a correction aberration generation unit configured to generate correction aberration, opposite to the off-axis aberration, in the image light emitted from the image generation unit, wherein the correction aberration generation unit is disposed on an optical path of the image light between the image generation unit and the light coupling unit, and wherein the light coupling unit is disposed off-axis relative to the image light.

17 Claims, 7 Drawing Sheets

SEE-THROUGH TYPE DISPLAY DEVICE AND AUGMENTED REALITY APPARATUS INCLUDING THE SAME

CROSS-REFERENCE TO RELATED APPLICATION

This application claims priority from Korean Patent Application No. 10-2018-0111022, filed on Sep. 17, 2018 in the Korean Intellectual Property Office, the disclosure of which is incorporated herein in its entirety by reference.

BACKGROUND

1. Field

Example embodiments of the present disclosure relate to a see-through type display device and an augmented reality apparatus including the same.

2. Description of the Related Art

As electronic devices and display devices capable of implementing virtual reality (VR) have been developed, interest therein is increasing. As a next stage of VR, technologies or solutions to realize augmented reality (AR) and mixed reality (MR) are being studied.

AR, unlike VR that is based on a complete virtual world, is a display technology to further increase the effect of reality by displaying virtual objects or information overlapped with the real world environment. While VR has been limitedly applied to only a field such as games or virtual experience, AR has a merit of being applied to various real environments. In particular, AR has attracted attention as one of the next generation display technologies suitable for a ubiquitous environment or an Internet of Things (IoT) environment. AR may be an example of MR in that AR shows the real world mixed with additional information such as a virtual world.

SUMMARY

One or more example embodiments provide a see-through type display device having improved optical properties.

One or more example embodiments provide a miniaturized display device.

One or more example embodiments provide an augmented reality apparatus having improved optical properties.

One or more example embodiments provide a miniaturized augmented reality apparatus.

Additional aspects will be set forth in part in the description which follows and, in part, will be apparent from the description, or may be learned by practice of example embodiments.

According to an aspect of an example embodiment, there is provided a see-through type display device including an image generation unit configured to emit image light, a light coupling unit configured to generate off-axis aberration in the image light, and a correction aberration generation unit configured to generate correction aberration, opposite to the off-axis aberration, in the image light emitted from the image generation unit, wherein the correction aberration generation unit is disposed on an optical path of the image light between the image generation unit and the light coupling unit, and wherein the light coupling unit is disposed off-axis relative to the image light.

The correction aberration generation unit may include a cylindrical lens.

The light coupling unit may include a holographic optical element configured to generate a holographic image, and the light coupling unit may be configured to focus the image light.

The off-axis aberration and the correction aberration may be offset from each other.

The correction aberration unit may be further configured to form an intermediate image of the image light within a focal length of the light coupling unit from the light coupling unit.

The see-through type display device may further include a focusing unit, wherein the focusing unit is configured to focus the image light to provide a focused image light to the light coupling unit.

The focusing unit may include a first focusing convex lens disposed between the image generation unit and the correction aberration generation unit.

The focusing unit may further include a second focusing convex lens disposed between the correction aberration generation unit and the light coupling unit.

The light coupling unit may be disposed from the second focusing lens at a location farther than a focal point of an optical system including the correction aberration generation unit and the focusing unit.

The image generation unit may include a spatial light modulator.

The image generation unit may further include a first polarization panel disposed between the spatial light modulator and a light source unit, a second polarization panel disposed between the spatial light modulator and the correction aberration generation unit, and wherein a polarization direction of the first polarization panel and a polarization direction of the second polarization panel are identical to each other.

The image generation unit may further include a reflection mirror disposed between the spatial light modulator and the second polarization panel.

The see-through type display device may further include a light source configured to emit internal light toward the image generation unit, and a collimating unit disposed between the light source and the image generation unit, wherein the image generation unit is further configured to generate the image light based on the internal light.

The light source unit may further include an optical fiber disposed between the light source and the collimating unit, and wherein the optical fiber is configured to provide the internal light from light source to the collimating unit.

The see-through type display device may further include a reflection unit configured to reflect the image light output from the correction aberration unit having the correction aberration to the light coupling unit.

According to an aspect of an example embodiment, there is provided an augmented reality apparatus including a pair of legs, a pair of image generation devices disposed between the pair of legs, a bridge portion configured to connect the pair of image generation devices, and a pair of light coupling units disposed under the pair of image generation devices, respectively, wherein each of the pair of image generation devices includes an image generation unit configured to emit image light, and a correction aberration generation unit configured to generate correction aberration in the image light, and wherein the pair of light coupling units is configured to generate off-axis aberration opposite to the correction aberration in the image light output from the correction aberration generation unit.

The pair of image generation devices may include a pair of reflection units opposite to the pair of light coupling units, respectively.

The pair of legs may extend in a first direction, the pair of image generation devices may extend in a second direction perpendicular to the first direction, and the pair of light coupling units may be separated from the reflection units in a third direction orthogonal to the first and second directions.

The augmented reality apparatus, wherein each of the pair of image generation devices may further include a controller configured to control the image generation unit to obtain image information of the image light.

The augmented reality apparatus may further include a pair of light source units disposed between the pair of image generation devices and the bridge portion, respectively

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
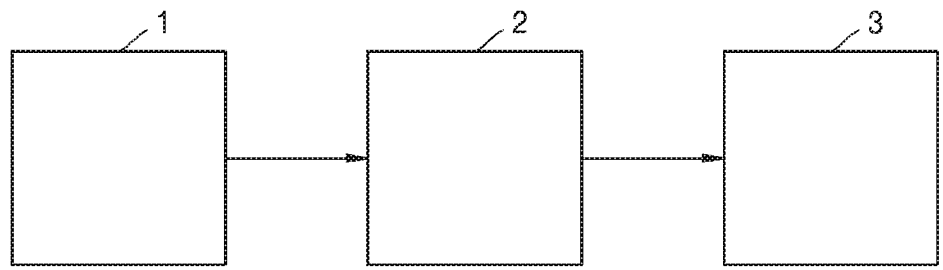
FIG. 1 is a conceptual diagram of a see-through type display device according to an example embodiment.

Reference will now be made in detail to example embodiments, examples of which are illustrated in the accompanying drawings, wherein like reference numerals refer to like elements throughout. Also, the size of each layer illustrated in the drawings may be exaggerated for convenience of explanation and clarity. In this regard, example embodiments may have different forms and should not be construed as being limited to the descriptions set forth herein.

Accordingly, example embodiments are merely described below, by referring to the figures, to explain aspects of the present description. In a layer structure, when a constituent element is disposed "above" or "on" to another constituent element, the constituent element may be only directly on the other constituent element or above the other constituent elements in a non-contact manner.

Throughout the specification, when a portion "includes" or "comprises" an element, another element may be further included, rather than excluding the existence of the other element, unless otherwise described. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Furthermore, terms such as "~portion", "~unit", "~module", and "~block" stated in the specification may signify a unit to process at least one function or operation and the unit may be embodied by hardware, software, or a combination of hardware and software.

FIG. 1 is a conceptual diagram of a see-through type display device 10 according to an example embodiment.

Referring to FIG. 1, the see-through type display device 10 according to an example embodiment may include an image generation unit 1, a correction aberration generation unit 2, and a light coupling unit 3. The image generation unit 1 may provide image light to the correction aberration generation unit 2. The image light may include image information. The image generation unit 1 may include a spatial light modulator (SLM). For example, the image generation unit 1 may include liquid crystal on silicon (LCoS). The image generation unit 1 may include pixels. The image light may be a combination of light emitted from the pixels. The light emitted from the pixels may have different phases. Accordingly, the image light may contain image information.

The correction aberration generation unit 2 may generate correction aberration in image light. For example, the correction aberration may include astigmatism and chromatic aberration. The correction aberration may be opposite to off-axis aberration generated by the light coupling unit 3. The off-axis aberration may be generated as the light coupling unit 3 is arranged off-axis relative to the image light. For example, the off-axis aberration may include astigmatism and chromatic aberration. When the correction aberration generation unit 2 is omitted, the image light may have off-axis aberration. The correction aberration generation unit 2 generates correction aberration opposite to the off-axis aberration in the image light, thereby reducing total aberration of the image light.

In example embodiments, the correction aberration generation unit 2 may include a cylindrical lens. For example, the correction aberration generation unit 2 may include a concave cylindrical lens. The correction aberration generation unit 2 may provide image light having correction aberration to the light coupling unit 3.

The light coupling unit 3 may reflect the image light. For example, the light coupling unit 3 may include a holographic optical element (HOE). The HOE may include an optical element for generating a hologram image. The light coupling unit 3 may operate as a concave mirror with respect to the image light. The light coupling unit 3 may focus the image light. The light coupling unit 3 may couple the image light to external light. The external light may be light incident on the light coupling unit 3 from the outside of the see-through type display device 10. The light coupling unit 3 may be arranged off-axis relative to the image light. The aberration generated by the light coupling unit 3 may be reduced by the correction aberration provided by the correction aberration generation unit 2.

Figure 2:
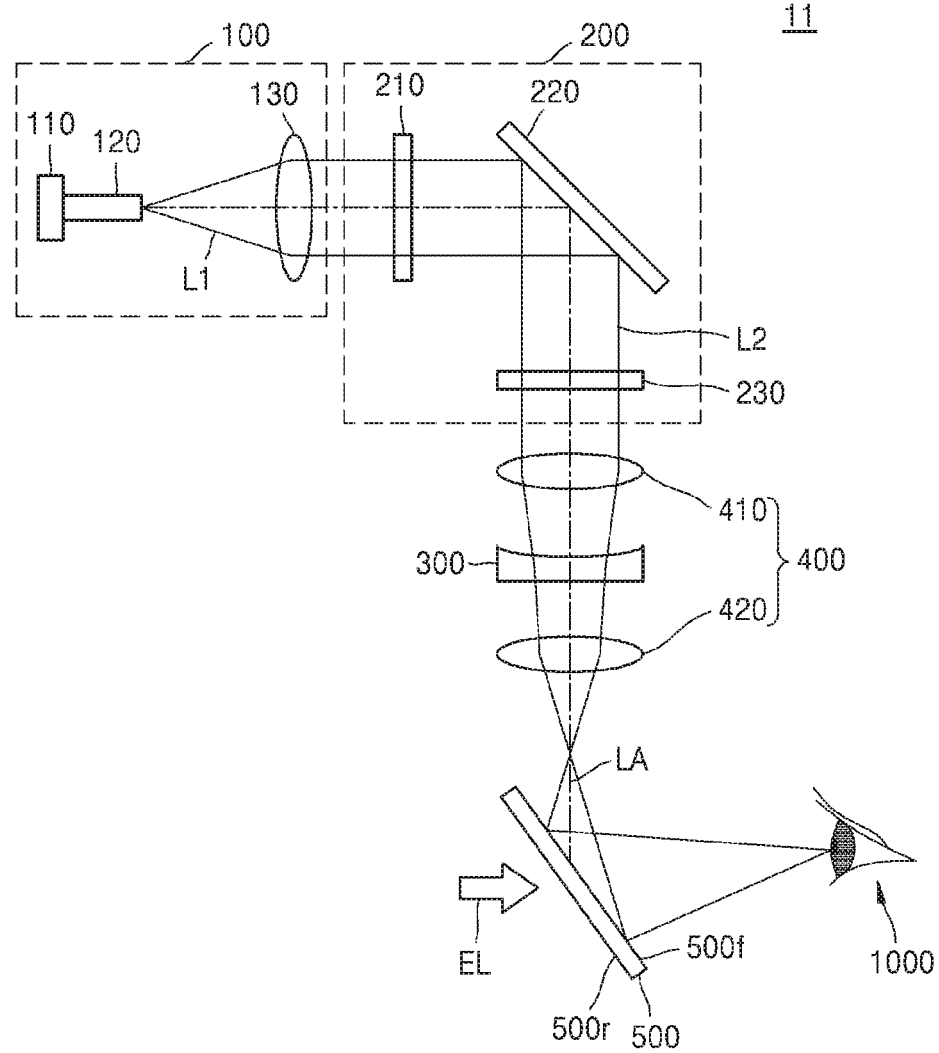
FIG. 2 is a conceptual diagram of a see-through type display device according to an example embodiment.

FIG. 2 is a conceptual diagram of a see-through type display device 11 according to an example embodiment.

Referring to FIG. 2, the see-through type display device 11 according to an example embodiment may include a light source unit 100, an image generation unit 200, a correction aberration generation unit 300, a focusing unit 400, and a light coupling unit 500. The light source unit 100 may include a light source 110, a light transmission unit 120, and a collimating unit 130. The light source 110 may emit internal light L1 toward the light transmission unit 120. For example, the light source 110 may include a light-emitting diode, an organic light-emitting diode, or a laser diode. In an example, the wavelength of the internal light L1 may be substantially the same as a recording wavelength of a hologram in the light coupling unit 500. In another example, the wavelength of the internal light L1 may be different from the recording wavelength of the hologram in the light coupling unit 500.

The light transmission unit 120 may be arranged between the light source 110 and the collimating unit 130 to provide the internal light L1 to the collimating unit 130. For example, the light transmission unit 120 may include optical fiber. In example embodiments, when the wavelength of the internal light L1 is different from the recording wavelength of the hologram in the light coupling unit 500, a filter, for example, narrow band pass filter, may be provided between the light transmission unit 120 and the light source 110 or between the light transmission unit 120 and the collimating unit 130. The internal light L1 that transmitted through the filter may have substantially the same wavelength as the recording wavelength of the hologram in the light coupling unit 500.

The collimating unit 130 may collimate the internal light L1 received from the light transmission unit 120. The collimated internal light L1 may be parallel light. For example, the collimating unit 130 may include a convex lens. The collimating unit 130 may provide the internal light L1 to the image generation unit 200.

The image generation unit 200 may generate image light L2 based on the internal light L1. The image light L2 may include image information. For example, the image generation unit 200 may modulate the internal light L1. The image generation unit 200 may include a first polarization panel 210, a spatial light modulator 220, and a second polarization panel 230. The first polarization panel 210 and the second polarization panel 230 may have the same polarization direction. For example, the light that transmitted through the first and second polarization panels 210 and 230 may be polarized in the same direction. The internal light L1 that transmitted through the first polarization panel 210 may reach the spatial light modulator 220.

The spatial light modulator 220 may modulate the internal light L1 that is polarized by the first polarization panel 210, to generate the image light L2. The spatial light modulator 220 may include pixels. The image light L2 may be a combination of light emitted from the pixels. The light emitted from the pixels may have different phases. Accordingly, the image light L2 may include image information. For example, the spatial light modulator 220 may include LCoS. The image light L2 may be polarized by the second polarization panel 230. The polarized image light L2 may be provided to the focusing unit 400.

The focusing unit 400 may include a first focusing lens 410 and a second focusing lens 420. The first and second focusing lenses 410 and 420 may be separated from each other with respect to the correction aberration generation unit 300 therebetween. The first and second focusing lenses 410 and 420 may focus the image light L2. For example, the first and second focusing lenses 410 and 420 may both be convex lenses. In example embodiments, the image light L2 incident on the first focusing lens 410 may be parallel light. As the image light L2 is focused, the see-through type display device 11 may be miniaturized, and the form factor may be reduced. The first focusing lens 410 may provide the image light L2 to the correction aberration generation unit 300. In example embodiments, the first and second focusing lenses 410 and 420 may reduce total chromatic aberration of the image light L2.

The correction aberration generation unit 300 may generate correction aberration in the image light L2. For example, the correction aberration may include astigmatism and chromatic aberration. The correction aberration may be opposite to the off-axis aberration generated by the light coupling unit 3. The off-axis aberration may be generated as the light coupling unit 500 is arranged off-axis relative to the image light L2. For example, the off-axis aberration may include astigmatism and chromatic aberration. When the correction aberration generation unit 300 is omitted, the image light L2 having the off-axis aberration may be provided to a user of the see-through type display device 11. The correction aberration generation unit 300 generates correction aberration opposite to the off-axis aberration in the image light L2, thereby reducing total aberration of the image light L2. In example embodiments, the correction aberration and the off-axis aberration may be offset from each other. Accordingly, the image light L2 may not have any aberration.

In example embodiments, the correction aberration generation unit 300 may include a cylindrical lens. For example, the correction aberration generation unit 300 may include a concave cylindrical lens. A degree of concaveness and a material of the concave cylindrical lens may be determined so that the concave cylindrical lens generates correction aberration in the image light L2 to reduce the total aberration of the image light L2. The image light L2 having correction aberration may be provided to the light coupling unit 500 after passing though the second focusing lens 420.

The light coupling unit 500 may be arranged off-axis relative to the image light L2 incident on the light coupling unit 500. For example, an angle between an optical axis LA of the image light L2 and a normal of a front surface 500f of the light coupling unit 500 may be greater than 0°. The optical axis LA of the image light L2 may not be perpendicular to the front surface 500f of the light coupling unit 500. As the light coupling unit 500 is arranged off-axis relative to the image light L2, off-axis aberration may be generated in the image light L2. As described above, the off-axis aberration may be offset by the correction aberration. In example embodiments, the off-axis aberration may be offset by the focusing unit 400. The total aberration of the image light L2 may be reduced or removed.

The light coupling unit 500 may couple the image light L2 to external light EL. The image light L2 may be incident on the front surface 500f of the light coupling unit 500. The image light L2 may be reflected by the front surface 500f of the light coupling unit 500. The external light EL may be incident on a rear surface 500r of the light coupling unit 500. For example, the external light EL may be light emitted from objects facing the rear surface 500r of the light coupling unit 500. The external light EL may transmit through the light coupling unit 500. Accordingly, the external light EL may be coupled to the image light L2. In example embodiments, the light coupling unit 500 may include an HOE. The HOE may be arranged on the front surface 500f of the light coupling unit 500. For example, the HOE may include an optical element for generating a hologram image. As the light coupling unit 500 includes the HOE, the light coupling unit 500 may be miniaturized. Accordingly, example embodiments may provide the see-through type display device 11 that is miniaturized.

The light coupling unit 500 may provide a wide field of view (FoV) to a user of the see-through type display device 11. For example, the FoV of the light coupling unit 500 may be about 90°. The example embodiment may provide the see-through type display device 11 having a wide field of view. When the light coupling unit 500 reflects the image light L2, the image light L2 may be focused. The light coupling unit 500 may operate as a concave mirror with respect to the image light L2.

An optical system including the image generation unit 200, the correction aberration generation unit 300, the focusing unit 400, and the light coupling unit 500 may satisfy the Scheimpflug condition. An intermediate image of the image light L2 may be formed within a focal length of the light coupling unit 500 from the front surface 500f of the light coupling unit 500. The intermediate image of the image light L2 may be an image generated by the optical system including the correction aberration generation unit 300 and the focusing unit 400. For example, the intermediate image of the image light L2 may be an image of the image light L2 that is transmitted through the second focusing lens 420 and is formed at a position adjacent to the light coupling unit 500. Accordingly, a clearer final image of the image light L2 may be provided to an eye 1000 of the user.

The light coupling unit 500 may be spaced apart from the second focusing lens 420 farther than a focal point of the optical system including the correction aberration generation unit 300 and the focusing unit 400. The image light L2 that transmitted through the second focusing lens 420 may pass the focal point of the optical system including the correction aberration generation unit 300 and the focusing unit 400 and reach the light coupling unit 500. The width of the image light L2 may decrease as the image light L2 is closer to the focal point from the second focusing lens 420. The width of the image light L2 may increase as the image light L2 is closer to the light coupling unit 500 from the focal point.

The light coupling unit 500 may provide coupling light of the image light L2 and the external light EL to the eye 1000 of the user of the see-through type display device 11. As a result, the user may see an image in which an image of an real object, that is, an image included in the external light EL, and a virtually formed image, that is, an image included in the image light L2, are mixed.

The correction aberration generation unit 300 may offset off-axis aberration that is generated as the light coupling unit 500 is arranged off-axis relative to the image light L2. Example embodiments may provide the see-through type display device 11 that provides the user with the image light L2 having low aberration or no aberration.

Figure 3A:
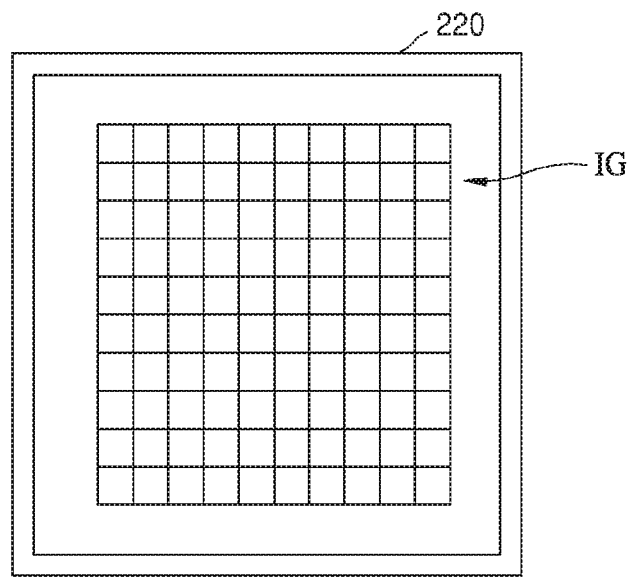
FIG. 3A illustrates an output image of a spatial light modulator.
Figure 3B:
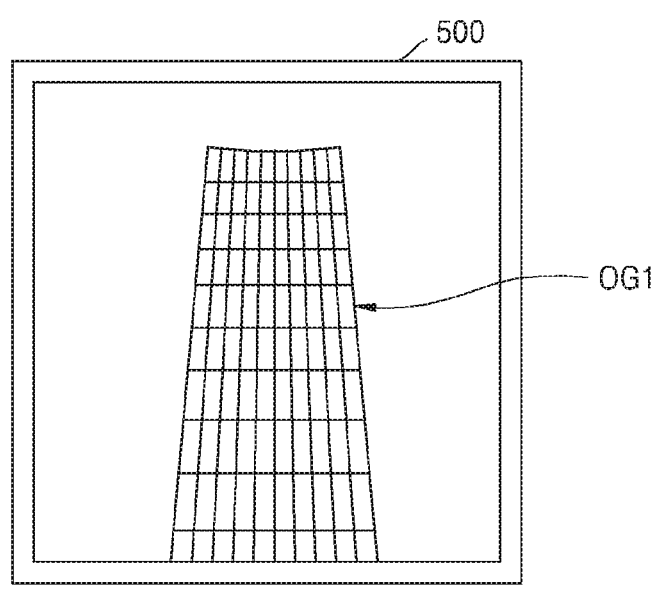
FIG. 3B illustrates an output image of a see-through type display device that does not include a correction aberration generation unit.
Figure 3C:
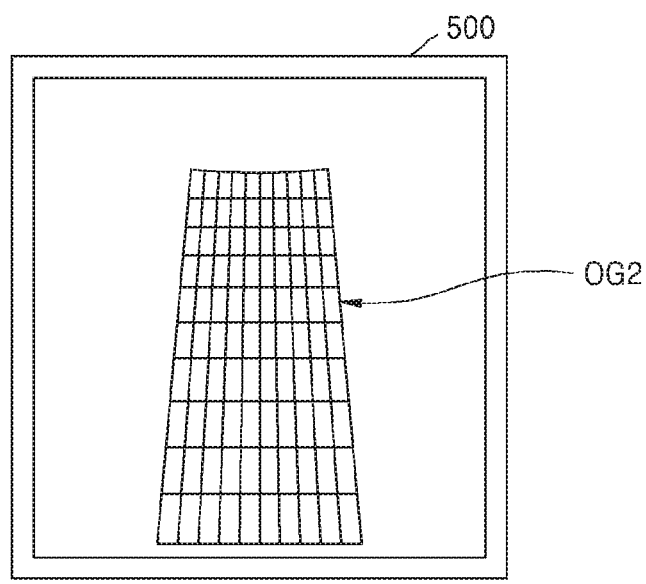
FIG. 3C illustrates an output image of a see-through type display device that includes a correction aberration generation unit.

FIG. 3A illustrates an output image of a spatial light modulator. FIG. 3B illustrates an output image of a see-through type display device that does not include a correction aberration generation unit. FIG. 3C illustrates an output image of a see-through type display device that includes a correction aberration generation unit. For simplicity of explanation, descriptions of elements that are substantially the same as those described with reference to FIG. 2 may be omitted.

Referring to FIG. 3A, the spatial light modulator 220 outputs an input image IG having a rectangular 10×10 lattice. The spatial light modulator 220 may be substantially the same as the spatial light modulator 220 of FIG. 2 that is described with reference to FIG. 2.

Referring to FIG. 3B, the see-through type display device that does not include the correction aberration generation unit 300 of FIG. 2 outputs a first output image OG1 having a trapezoid 10×10 lattice. The first output image OG1 corresponds to the input image IG. For example, since the input image IG is a 10×10 lattice image, the first output image OG1 is also a 10×10 lattice image. The first output image OG1 is formed on the light coupling unit 500. The lowermost part of first output image OG1 is omitted and only the upper parts of the tenth row of lattices from the top are output due to the off-axis aberration. That is, the lower parts of the tenth lattices from the top are not output to the light coupling unit 500.

Referring to FIG. 3C, the see-through type display device including the correction aberration generation unit 220 of FIG. 2, that is, the see-through type display device 11 of FIG. 2, outputs a second output image OG2 having a trapezoid 10×10 lattice. The second output image OG2 corresponds to the input image IG. For example, since the input image IG is a 10×10 lattice image, the second output image OG2 is also a 10×10 lattice image. The second output image OG2 includes all parts of the 10×10 lattice without omitted parts, which results in the aberration of image light being improved by the correction aberration generation unit 220 of FIG. 2.

Figure 4:
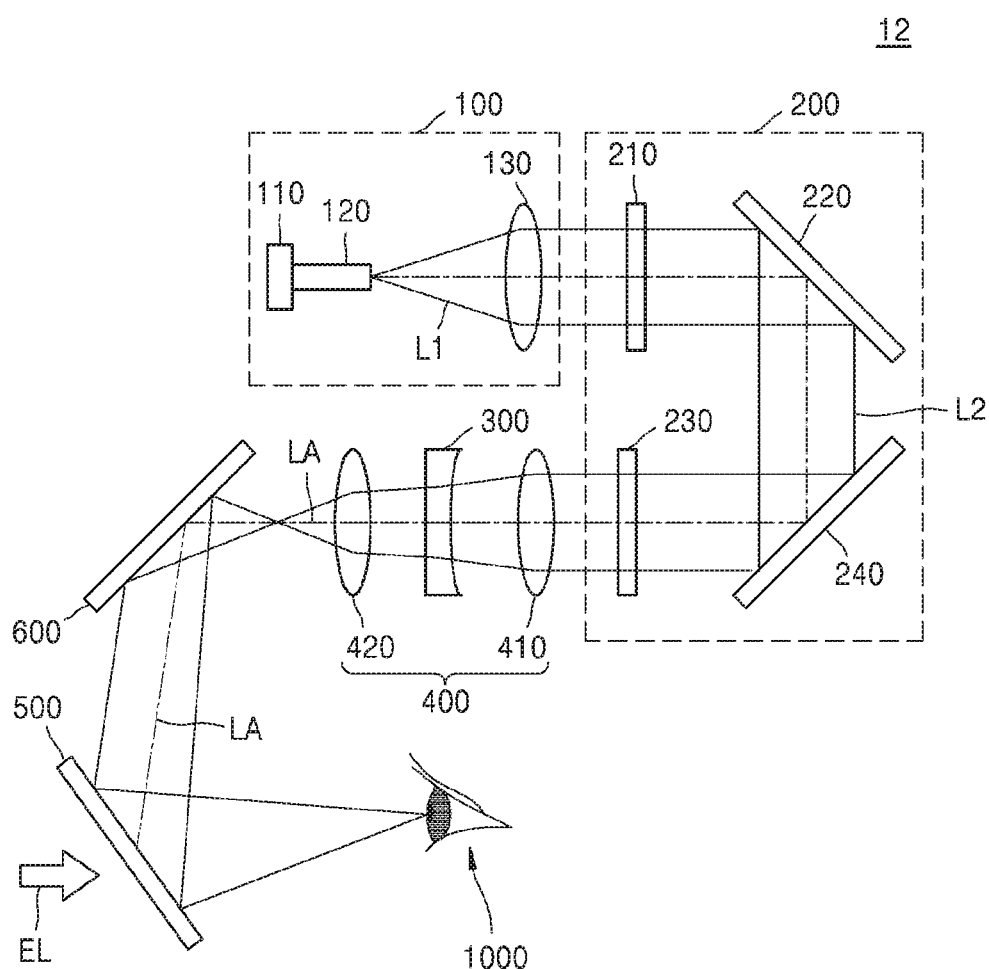
FIG. 4 is a conceptual diagram of a see-through type display device according to an example embodiment.

FIG. 4 is a conceptual diagram of a see-through type display device 12 according to an example embodiment. For simplicity of explanation, descriptions of elements that are substantially the same as those described with reference to FIG. 2 may be omitted.

Referring to FIG. 4, the see-through type display device 12 according to an example embodiment may include the light source unit 100, the image generation unit 200, the correction aberration generation unit 300, the focusing unit 400, the light coupling unit 500, and a reflection unit 600. The light source unit 100, the correction aberration generation unit 300, the focusing unit 400, and the light coupling unit 500 may be substantially the same as those described with reference to FIG. 2.

Referring to FIG. 4, the image generation unit 200 may further include a reflection mirror 240. The reflection mirror 240 may be arranged on an optical path between the spatial light modulator 220 and the second polarization panel 230. The reflection mirror 240 may reflect the image light L2 emitted from the spatial light modulator 220 toward the second polarization panel 230. For example, the reflection mirror 240 may be a flat mirror that is inclined by 45° with respect to the optical axis LA of the image light L2. The reflection mirror 240 may increase a degree of freedom in the configuration of the optical system. Accordingly, the see-through type display device 12 may be miniaturized.

The reflection unit 600 may be arranged on an optical path of the image light L2 between the focusing unit 400 and the light coupling unit 500. The reflection unit 600 reflects the image light L2 that passed through the focusing unit 400, thereby providing the image light L2 to the light coupling unit 500. For example, the reflection unit 600 may include a flat mirror that is inclined by 45° with respect to the optical axis LA of the image light L2 incident on the reflection unit 600. The reflection mirror 240 may increase a degree of freedom in the configuration of the optical system. Accordingly, the see-through type display device 12 may be miniaturized.

The reflection unit 600 may be spaced apart from the focusing unit 400 farther than the focal point of the optical system including the correction aberration generation unit 300 and the focusing unit 400. The image light that passed through the second focusing lens 420 may reach the reflection unit 600 after passing the focal point. The image light L2 may diverge after passing the focal point of the focusing unit 400.

In example embodiments, the reflection unit 600 may be arranged at a position adjacent to an eyebrow of the user of the see-through type display device 12, and the light coupling unit 500 may be arranged in front of the eye 1000 of the user. The image light L2 is reflected by the reflection unit 600 from the position adjacent to the eyebrow toward a position adjacent to the eye 1000 of the user, and then reflected again by the light coupling unit 500 to be provided to the eye 1000.

The light coupling unit 500 may include a HOE. The light coupling unit 500 may be miniaturized. The present disclosure may provide the see-through type display device 12 that is miniaturized.

The correction aberration generation unit 300 may offset off-axis aberration that is generated as the light coupling unit 500 is arranged off-axis relative to the image light L2. The example embodiment may provide the see-through type display device 12 that provides the user with the image light L2 having low aberration or no aberration.

Figure 5:
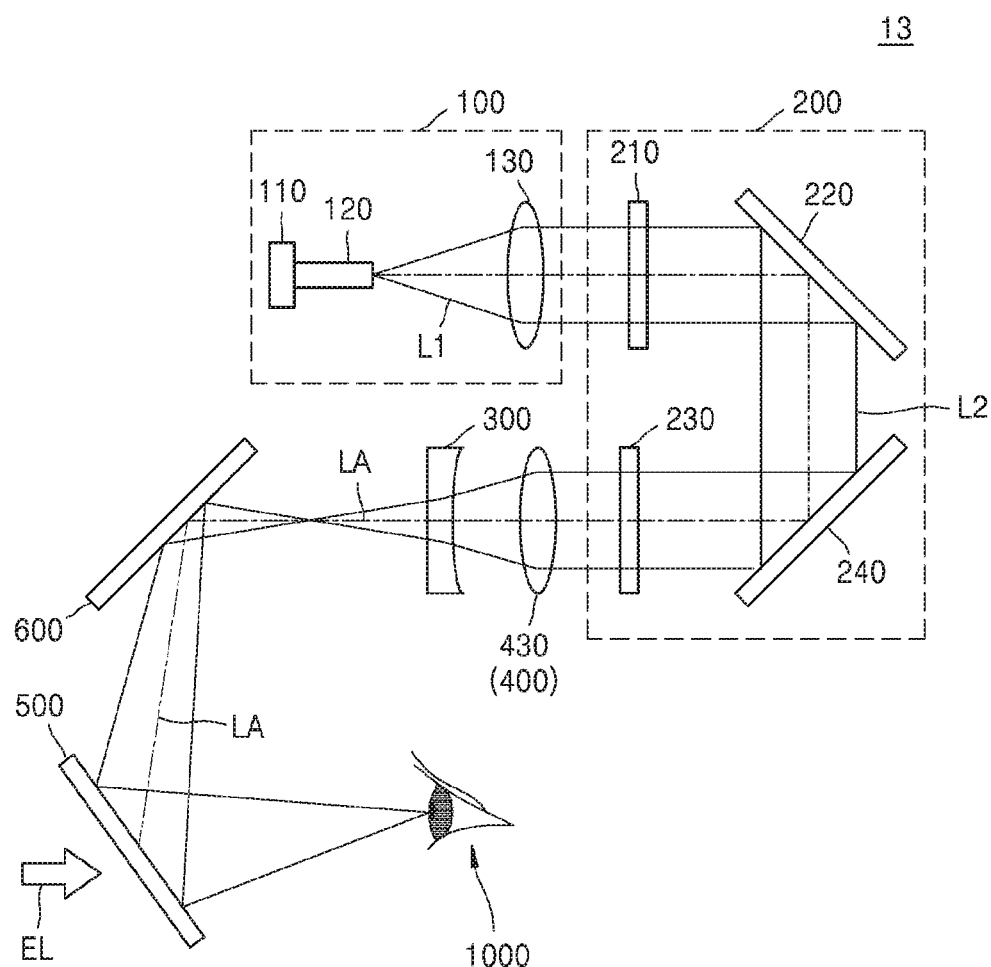
FIG. 5 is a conceptual diagram of a see-through type display device according to an example embodiment.

FIG. 5 is a conceptual diagram of a see-through type display device 13 according to an example embodiment. For simplicity of explanation, descriptions of elements that are substantially the same as those described with reference to FIGS. 2 and 4 may be omitted.

Referring to FIG. 5, the see-through type display device 13 according to the example embodiment may include the light source unit 100, the image generation unit 200, the correction aberration generation unit 300, the focusing unit 400, the light coupling unit 500, and the reflection unit 600. The light source unit 100, the image generation unit 200, the correction aberration generation unit 300, the light coupling unit 500, and the reflection unit 600 may be substantially the same as those described with reference to FIG. 4.

The focusing unit 400 may include a focusing lens 430. The focusing lens 430 may be substantially the same as the first focusing lens 410 described with reference to FIG. 2. In other words, unlike the description with reference to FIGS. 2 and 4, the focusing unit 400 may not include the second focusing lens 420. The reflection unit 600 may be spaced apart from a center of the focusing lens 430 farther than a focal length of the focusing lens 430.

The light coupling unit 500 may include a HOE. The light coupling unit 500 may be miniaturized. The example embodiment may provide the see-through type display device 13 that is miniaturized.

The correction aberration generation unit 300 may offset off-axis aberration that is generated as the light coupling unit 500 is arranged off-axis relative to the image light L2. The example embodiment may provide the see-through type display device 13 that provides the user with the image light L2 having low aberration or no aberration.

Figure 6:
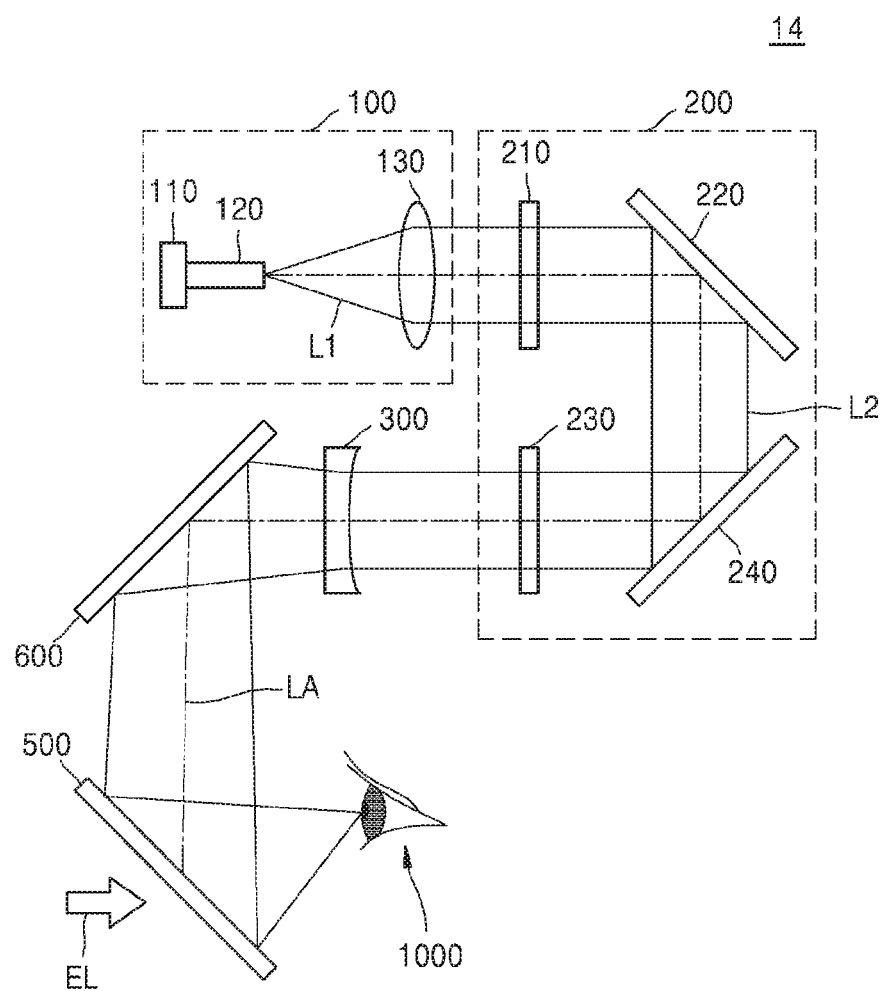
FIG. 6 is a conceptual diagram of a see-through type display device according to an example embodiment.

FIG. 6 is a conceptual diagram of a see-through type display device 14 according to an example embodiment. For simplicity of explanation, descriptions of elements that are substantially the same as those described with reference to FIGS. 2 and 4 may be omitted.

Referring to FIG. 6, the see-through type display device 14 according to the example embodiment may include the light source unit 100, the image generation unit 200, the correction aberration generation unit 300, the light coupling unit 500, and the reflection unit 600. The light source unit 100, the image generation unit 200, the correction aberration generation unit 300, the light coupling unit 500, and the reflection unit 600 may be substantially the same as those described with reference to FIG. 4.

Unlike the description in FIG. 4, the see-through type display device 14 described with reference to FIG. 6 may not include the focusing unit 400 of FIG. 4. Accordingly, the image light L2 may not be focused until reaching the light coupling unit 500. In example embodiments, the image light L2 provided to the correction aberration generation unit 300 may be parallel light. The correction aberration generation unit 300 may diverge the image light L2. The reflection unit 600 may reflect the image light L2 having a diverging form toward the light coupling unit 500. The light coupling unit 500 may provide the image light L2 to the eye 1000 of the user by focusing the same.

The light coupling unit 500 may include a HOE. The light coupling unit 500 may be miniaturized. The example embodiment may provide the see-through type display device 14 that is miniaturized.

The correction aberration generation unit 300 may offset off-axis aberration that is generated as the light coupling unit 500 is arranged off-axis relative to the image light L2. The example embodiment may provide the see-through type display device 14 that provides the user with the image light L2 having low aberration or no aberration.

Figure 7:
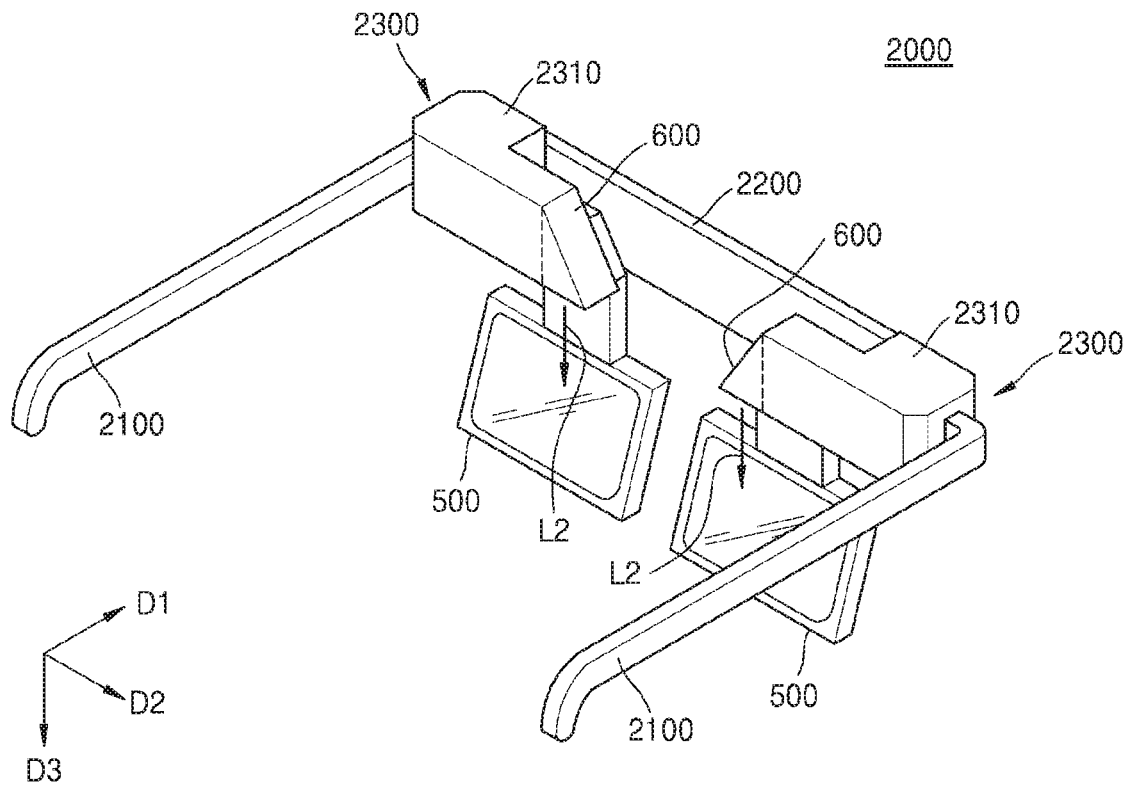
FIG. 7 is a perspective view of an augmented reality apparatus according to an example embodiment.

FIG. 7 is a perspective view of an augmented reality apparatus 2000 according to an example embodiment. For simplicity of explanation, descriptions of elements that are substantially the same as those described with reference to FIG. 3 may be omitted.

Referring to FIG. 7, the augmented reality apparatus 2000 according to the example embodiment may include a pair of legs 2100, a bridge portion 2200, and a pair of image generation devices 2300. The pair of legs 2100 may extend in a first direction D1. The pair of legs 2100 may be spaced apart from each other in a second direction D2 perpendicular to the first direction D1. The pair of legs 2100 may be legs of glasses. In example embodiments, the pair of legs 2100 may be folded toward the bridge portion 2200.

The bridge portion 2200 may be provided between the pair of legs 2100. The bridge portion 2200 may extend in the second direction D2. In an example, both end portions of the bridge portion 2200 may respectively contact the pair of legs 2100. In another example, both end portions of the bridge portion 2200 may respectively contact the pair of image generation devices 2300. For example, the bridge portion 2200 may be separated from the pair of legs 2100 with the pair of image generation devices 2300 interposed therebetween.

Each of the pair of image generation devices 2300 may include any one of the see-through type display devices 12, 13, and 14 described with reference to FIGS. 4 to 6. Each of the pair of image generation devices 2300 may include a body portion 2310, the reflection unit 600, and the light coupling unit 500. When each of the pair of image generation devices 2300 is one of the see-through type display devices 12 and 13 described with reference to FIGS. 4 and 5, the light source unit 100 of FIG. 4 or 5, the image generation unit 200 of FIG. 4 or 5, the correction aberration generation unit 300 of FIG. 4 or 5, and the focusing unit 400 of FIG. 4 or 5 may be provided in the body portion 2310. When each of the pair of image generation devices 2300 is the see-through type display device 14 of FIG. 6, the light source unit 100 of FIG. 6, the image generation unit 200 of FIG. 6, and the correction aberration generation unit 300 of FIG. 6 may be provided in the body portion 2310. In example embodiments, the light source unit 100 may be arranged outside the body portion 2310 to emit internal light to the body portion 2310.

In some embodiments, each of the pair of image generation devices 2300 may further include a controller (not shown) for controlling the image generation unit 200 of FIGS. 4 to 6 and determining image information of the image light L2.

A pair of body portions 2310 may be respectively provided on both end portions of the bridge portion 2200. The pair of body portions 2310 may extend along the bridge portion 2200. The pair of body portions 2310 may respectively contact the pair of legs 2100. The pair of body portions 2310 may emit a pair of image lights L2. In example embodiments, each of the pair of image lights L2 may travel in the second direction D2 and in a direction opposite to the second direction D2.

A pair of reflection units 600 may respectively reflect the pair of image lights L2 toward a pair of light coupling units 500. In example embodiments, the pair of image lights L2 may travel in a third direction D3 orthogonal to the first and second directions D1 and D2.

The pair of light coupling units 500 may respectively face the pair of reflection units 600. The pair of light coupling units 500 may be respectively separated from the pair of reflection units 600 in the third direction D3. The pair of light coupling units 500 may respectively reflect the pair of image lights L2 toward a pupil of the user. The pair of light coupling units 500 may operate as a concave mirror with respect to the pair of image lights L2. Accordingly, the pair of image lights L2 may be focused on the eyes 1000 of the user in FIGS. 4 to 6 by the pair of light coupling units 500.

The example embodiment may provide a see-through type display device having improved optical properties and an augmented reality apparatus. The present disclosure may provide a miniaturized see-through type display device and an augmented reality apparatus.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A see-through type display device comprising:
    a light source configured to emit internal light;
    an image generation assembly including a spatial light modulator, a first polarization panel, a second polarization panel, and a reflection mirror, the image generation assembly being configured to receive the internal light and emit image light;
    a holographic optical element configured to generate off-axis aberration in the image light; and
    a correction aberration generation lens configured to generate correction aberration, opposite to the off-axis aberration, in the image light emitted from the image generation assembly,
    wherein the correction aberration generation lens is disposed on an optical path of the image light between the image generation assembly and the holographic optical element,
    wherein the holographic optical element is disposed off-axis relative to the image light,
    wherein the first polarization panel is disposed between the spatial light modulator and the light source, and
    wherein the reflection mirror is disposed between the spatial light modulator and the second polarization panel and spaced apart from an optical path of the internal light between the light source and the spatial light modulator.

2. The see-through type display device of claim 1, wherein the correction aberration generation lens is a cylindrical lens.

3. The see-through type display device of claim 2, further comprising a focusing lens assembly, wherein the focusing lens assembly is configured to focus the image light to provide a focused image light to the holographic optical element.

4. The see-through type display device of claim 3, wherein the focusing lens assembly comprises a first focusing lens disposed between the image generation assembly and the correction aberration generation lens.

5. The see-through type display device of claim 4, wherein the focusing lens assembly further comprises a second focusing lens disposed between the correction aberration generation lens and the holographic optical element.

6. The see-through type display device of claim 5, wherein the holographic optical element is disposed apart from the second focusing lens at a location farther than a focal point of an optical system comprising the correction aberration generation lens and the focusing lens assembly.

7. The see-through type display device of claim 1, wherein the holographic optical element is configured to generate a holographic image, and focus the image light.

8. The see-through type display device of claim 1, wherein the correction aberration generation lens is further configured to form an intermediate image of the image light within a focal length of the holographic optical element from the holographic optical element.

9. The see-through type display device of claim 1,
    wherein a polarization direction of the first polarization panel and a polarization direction of the second polarization panel are identical to each other.

10. The see-through type display device of claim 1, further comprising:
    a collimating lens disposed between the light source and the image generation assembly,
    wherein the image generation assembly is further configured to generate the image light based on the internal light.

11. The see-through type display device of claim 10, further comprising an optical fiber disposed between the light source and the collimating lens, and
    wherein the optical fiber is configured to provide the internal light from the light source to the collimating lens.

12. The see-through type display device of claim 1, further comprising a second reflection mirror configured to reflect the image light output from the correction aberration generation lens having the correction aberration to the holographic optical element.

13. An augmented reality apparatus comprising:
    a pair of legs;
    a pair of image generation devices disposed between the pair of legs;
    a bridge portion configured to connect the pair of image generation devices; and
    a pair of holographic optical elements disposed under the pair of image generation devices, respectively,
    wherein each of the pair of image generation devices comprises:
    a light source configured to emit light;
    an image generation assembly including a spatial light modulator, a first polarization panel, a second polarization panel, and a reflection mirror, the image generation assembly being configured to receive the light and emit image light; and a correction aberration generation lens configured to generate correction aberration in the image light, wherein the first polarization panel is disposed between the spatial light modulator and the light source, and wherein the reflection mirror is disposed between the spatial light modulator and the second polarization panel and spaced apart from an optical path of the internal light between the light source and the spatial light modulator, wherein the correction aberration generation lens is disposed on an optical path of the image light between the image generation assembly and the holographic optical element, wherein the holographic optical element is disposed off-axis relative to the image light, and wherein each of the pair of holographic optical elements is configured to generate off-axis aberration opposite to the correction aberration in the image light output from each of the correction aberration generation lens.

14. The augmented reality apparatus of claim 13, wherein the pair of image generation devices comprise a pair of reflection mirrors opposite to the pair of holographic optical elements, respectively.

15. The augmented reality apparatus of claim 14, wherein the pair of legs extend in a first direction,
the pair of image generation devices extend in a second direction perpendicular to the first direction, and
the pair of holographic optical elements are separated from the pair of reflection mirrors in a third direction orthogonal to the first and second directions.

16. The augmented reality apparatus of claim 13, wherein each of the pair of image generation devices further comprises a controller configured to control the image generation assembly to obtain image information of the image light.

17. The augmented reality apparatus of claim 13, further comprising a pair of light sources disposed between the pair of image generation devices and the bridge portion, respectively.

* * * * *